(12) United States Patent
Hellot et al.

(10) Patent No.: US 10,960,613 B2
(45) Date of Patent: Mar. 30, 2021

(54) FIBER TEXTURE FOR FABRICATING AN AEROENGINE CASING

(71) Applicant: SAFRAN AIRCRAFT ENGINES, Paris (FR)

(72) Inventors: Jérémy Hellot, Moissy-Cramayel (FR); Sylvain Corradini, Moissy-Cramayel (FR); Hubert Jean Marie Fabre, Moissy-Cramayel (FR)

(73) Assignee: SAFRAN AIRCRAFT ENGINES, Paris (FR)

( * ) Notice: Subject to any disclaimer, the term of this patent is extended or adjusted under 35 U.S.C. 154(b) by 440 days.

(21) Appl. No.: 15/988,385

(22) Filed: May 24, 2018

(65) Prior Publication Data

US 2018/0339468 A1 Nov. 29, 2018

(30) Foreign Application Priority Data

May 24, 2017 (FR) ...................... 1754635

(51) Int. Cl.
| | |
|---|---|
| *B29C 70/24* | (2006.01) |
| *B29B 11/16* | (2006.01) |
| *B32B 5/08* | (2006.01) |
| *D03D 3/02* | (2006.01) |
| *D03D 25/00* | (2006.01) |

(Continued)

(52) U.S. Cl.
CPC .............. *B29C 70/24* (2013.01); *B29B 11/16* (2013.01); *B32B 5/08* (2013.01); *D03D 1/00* (2013.01); *D03D 3/02* (2013.01); *D03D 3/06* (2013.01); *D03D 11/00* (2013.01); *D03D 25/005* (2013.01); *B29C 70/48* (2013.01); *B29K 2063/00* (2013.01);

(Continued)

(58) Field of Classification Search
None
See application file for complete search history.

(56) References Cited

U.S. PATENT DOCUMENTS

2014/0283977 A1* 9/2014 Mathon ................. B29C 53/562
156/169

FOREIGN PATENT DOCUMENTS

| FR | 2 902 802 A1 | 12/2007 |
| GB | 2449907 | * 12/2008 |

(Continued)

OTHER PUBLICATIONS

Machine translation of WO2010001003 (Year: 2010).*

(Continued)

*Primary Examiner* — Shawn Mckinnon
(74) *Attorney, Agent, or Firm* — Pillsbury Winthrop Shaw Pittman LLP (57) ABSTRACT

A fiber texture presents the shape of a strip extending in a longitudinal direction over a determined length between a proximal portion and a distal portion, and in a lateral direction over a determined width between first and second lateral edges. The fiber texture presents three-dimensional or multilayer weaving. The proximal portion of the fiber texture includes an end portion extending in the lateral direction so as to be set back from at least one of the first and second lateral edges and over a determined width that is less than the width of the fiber texture. The end portion projects in the longitudinal direction from at least one longitudinal edge of the fiber texture, the end portion extending in the longitudinal direction between a first end connected to the fiber texture and a free, second end opposite from the first end.

10 Claims, 12 Drawing Sheets

(51) Int. Cl.
  *D03D 11/00* (2006.01)
  *D03D 3/06* (2006.01)
  *D03D 1/00* (2006.01)
  B29C 70/48 (2006.01)
  B29K 63/00 (2006.01)
  B29K 105/08 (2006.01)
(52) U.S. Cl.
  CPC .. *B29K 2105/0845* (2013.01); *D10B 2505/02* (2013.01); *F05D 2300/603* (2013.01)

(56) References Cited

FOREIGN PATENT DOCUMENTS

WO     WO 97/43983 A1    11/1997
WO     WO 2010/001003 A1    1/2010

OTHER PUBLICATIONS

Machine translation of FR2902802 (Year: 2007).*
Search Report as issued in French Patent Application No. 1754635, dated Feb. 7, 2018.

* cited by examiner

FIBER TEXTURE FOR FABRICATING AN AEROENGINE CASING

CROSS REFERENCE TO RELATED APPLICATIONS

This application claims priority to French Patent Application No. 1754635, filed May 24, 2017, the entire content of which is incorporated herein by reference in its entirety.

FIELD

The present invention relates to a method of fabricating a fiber texture suitable for use, particularly, but not exclusively, for forming the fiber reinforcement of an aeroengine fan casing made of composite material (fiber reinforcement densified by a matrix).

BACKGROUND

Figure 1:
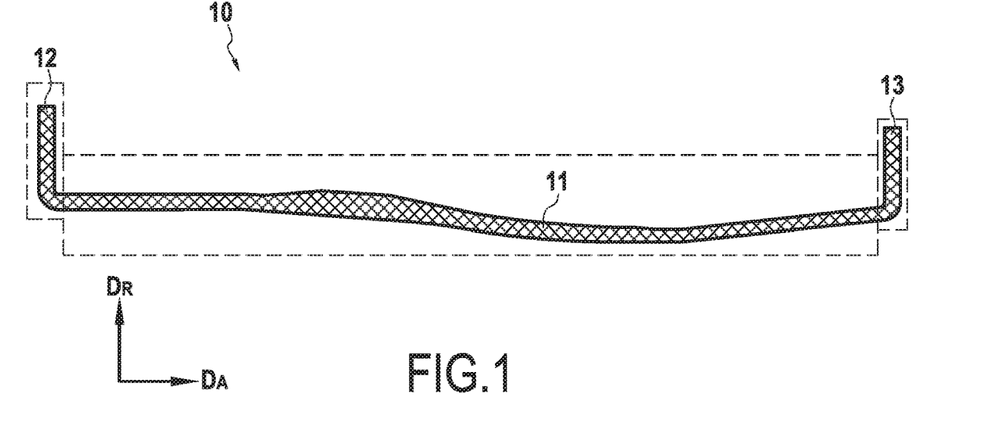
FIG. 1 is a diagrammatic half-view in axial section of a prior art fan casing made of composite material.

FIG. 1 shows the profile of an aeroengine fan casing 10 in section. The casing 10 presents a shroud 11 that extends widthwise in an axial direction $D_A$, with two flanges 12 and 13 extending respectively from the two ends of the shroud 11 in a radial direction $D_R$.

Figure 2:
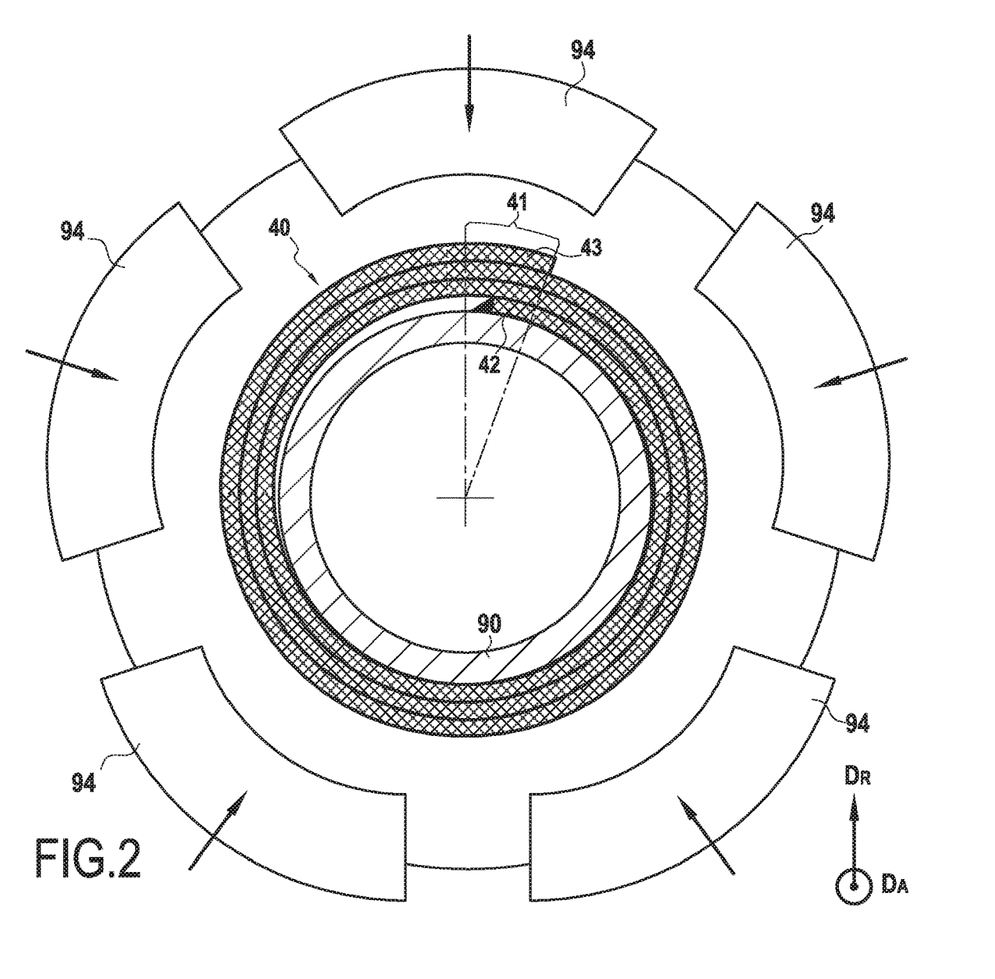
FIG. 2 is a diagrammatic radial section view showing a fiber preform for fabricating the FIG. 1 casing.

The fabrication of such a casing begins by making a fiber texture in the form of a strip, the fiber texture being made by three-dimensional weaving between a plurality of layers of warp yarns and a plurality of layers of weft yarns. The fiber texture as obtained in this way is wound for a plurality of turns on a mold or tooling 90 having the shape of the casing that is to be made and the texture is held between the mold 90 and segments 94 forming a mold cover so as to obtain a fiber preform 40, as shown in FIG. 2. In order to improve the mechanical strength of the casing, in particular against impacts, an overlap zone 41 is arranged in the preform 40 in which the thickness of the preform, and consequently the thickness of the resulting casing, is of greater size since it includes an additional thickness of preform corresponding to a proximal portion 42, i.e. the start of winding the preform on the mold, being overlapped by means of a distal portion 43 of the preform 40, i.e. the end of winding the preform on the mold. This overlap makes it possible to retain good mechanical characteristics in the zone corresponding to the start and to the end of the winding of the fiber preform.

Once the fiber preform has been made, i.e. after the fiber texture has finished being wound, the tooling carrying the fiber preform is closed by the mold covers and then transported to a stove or oven in which the preform is densified with a matrix, which matrix may be obtained in particular by injecting a matrix-precursor resin into the fiber preform and then polymerizing it.

Nevertheless, that fabrication technique presents drawbacks, in particular concerning the flanges in the overlap zone. Specifically, although extra thickness of the shroud is necessary in the overlap zone in order to provide the casing with its mechanical performance, this same extra thickness needs to be eliminated in a zone adjacent or close to the flanges so as to enable the casing to be mounted on an aeroengine. Thus, once the flanges have been fabricated by injection and polymerization, they are machined in the overlap zone in order to eliminate their local extra thickness. Such machining presents the following drawbacks:

increasing the time and the cost of fabrication;
difficulty in obtaining correct dimensions, since machining areas of the flanges leads to releasing internal stresses within the part in a manner that is difficult to predict or control; and
running the risk of decreasing the mechanical performance of the casing by breaking some of the fibers during the machining.

SUMMARY

An aspect of the invention seeks to avoid such drawbacks, and for this purpose it proposes a fiber texture in the form of a strip extending in a longitudinal direction over a determined length between a proximal portion and a distal portion, and in a lateral direction over a determined width between a first lateral edge and a second lateral edge, the fiber texture presenting three-dimensional or multilayer weaving between a plurality of layers of warp yarns and a plurality of layers of weft yarns; the fiber texture being characterized in that its proximal portion has an end portion extending in the lateral direction so as to be set back from at least one of the first and second lateral edges and over a determined width that is less than the width of the fiber texture, the end portion projecting in the longitudinal direction from at least one longitudinal edge of the fiber texture, the end portion extending in the longitudinal direction between a first end connected to the fiber texture and a free, second end opposite from the first end.

Thus, because the proximal portion has an end portion of width that is smaller than the width of the fiber texture away from the proximal portion, no extra thickness is formed in the lateral zones of the fiber texture that are for forming the flange(s) of the casing where there is overlap between the proximal portion and the distal portion. Consequently, the machining of the resulting part in the flange portion(s) of the overlap zone needed to obtain a casing having the desired shape and dimensions is reduced considerably, or even eliminated.

In a first particular characteristic of the fiber texture of the invention, it includes a two-dimensional fabric layer extending from the longitudinal edge of the fiber texture from which the end portion projects and from one lateral edge of the end portion, the two-dimensional fabric layer presenting thickness that is less than the thickness of the fiber texture. The two-dimensional fabric layer serves to improve the final appearance of the part in the cutout zones since the residues or fuzz of fibers where the yarns are cut are covered by the two-dimensional fabric layer and are therefore not visible in the final part.

In a second particular characteristic of the fiber texture of the invention, the end portion projects in the longitudinal direction from first and second longitudinal edges of the fiber texture and has an intermediate position between the first and second lateral edges of the fiber texture, the end portion extending in the longitudinal direction between a first end connected to the fiber texture and a free, second end opposite from the first end. This configuration of the end portion is beneficial when the fiber texture is for fabricating a casing having two flanges (upstream and downstream).

Under such circumstances, in a third particular characteristic of the fiber texture of the invention, it has a first two-dimensional fabric layer extending from the first longitudinal edge of the fiber texture and the first lateral edge of the end portion, and a second two-dimensional fabric layer extending from the second longitudinal edge of the fiber texture and the second lateral edge of the end portion, the first and second two-dimensional fabric layers presenting thickness less than the thickness of the fiber texture. The two-dimensional fabric layers serve to improve the final aspect of the part in the cutout zones, since the residues or fuzz of fibers where the yarns are cut are covered by the two-dimensional fabric layers and are therefore not visible in the final part.

In a fourth particular characteristic of the fiber texture of the invention, the longitudinal edge(s) of the fiber texture and the free end of the end portion present a bevel shape. The bevel shape of the longitudinal edge(s) and of the free end serves to avoid having a transition that is too abrupt when stacking the first turns of the fiber texture on the proximal portion.

In a fifth particular characteristic of the fiber texture of the invention, the first and second lateral edges of the end portion present a bevel shape. The bevel shape of the lateral edges serves to avoid a transition that is too abrupt when stacking the first turns of the fiber texture on the proximal portion.

In a sixth particular characteristic of the fiber texture of the invention, the distal portion of the fiber texture includes a longitudinal edge presenting a bevel shape. The bevel shape of the longitudinal edge of the distal portion serves to avoid a transition that is too abrupt when stacking the last turn of the fiber texture on the proximal portion.

According to a seventh particular characteristic of the fiber texture of the invention, the distal portion of the fiber texture includes a longitudinal edge presenting:

a first portion of bevel shape that is inverted relative to the bevels of the first and second longitudinal edges of the fiber texture and of the free end of the end portion, and extending in the lateral direction from the first lateral edge of the fiber texture and over a width less than the width of the fiber texture;

a second portion of bevel shape that is inverted relative to the bevels of the first and second longitudinal edges of the fiber texture and of the free end of the end portion, and extending in the lateral direction from the first lateral edge of the fiber texture and over a width less than the width of the fiber texture; and a third portion of rectilinear shape, i.e. without any bevel, present between the first and second portions, the third portion extending in the lateral direction over a width corresponding to the width of the end portion of the proximal portion of the fiber texture.

The bevel shape of the first and second portions of the longitudinal edge of the distal portion makes it possible to avoid a transition that is too abrupt when stacking the last turn of the fiber texture on the proximal portion.

Another aspect of the invention also provides a gas turbine casing made of composite material with fiber reinforcement comprising a plurality of superposed layers of fiber texture of the invention, the fiber reinforcement being densified by a matrix.

In yet another aspect of the invention also provides a gas turbine aeroengine having a fan casing of the invention.

BRIEF DESCRIPTION OF THE DRAWINGS

Other characteristics and benefits of the invention appear from the following description of particular embodiments of the invention, given as non-limiting examples and with reference to the accompanying drawings, in which.

DETAILED DESCRIPTION

Aspects of the invention apply in general manner to fabricating textile structures for use in fabricating casings out of composite materials, such casings comprising a drum or shroud having annular flanges at its ends.

Figure 3:
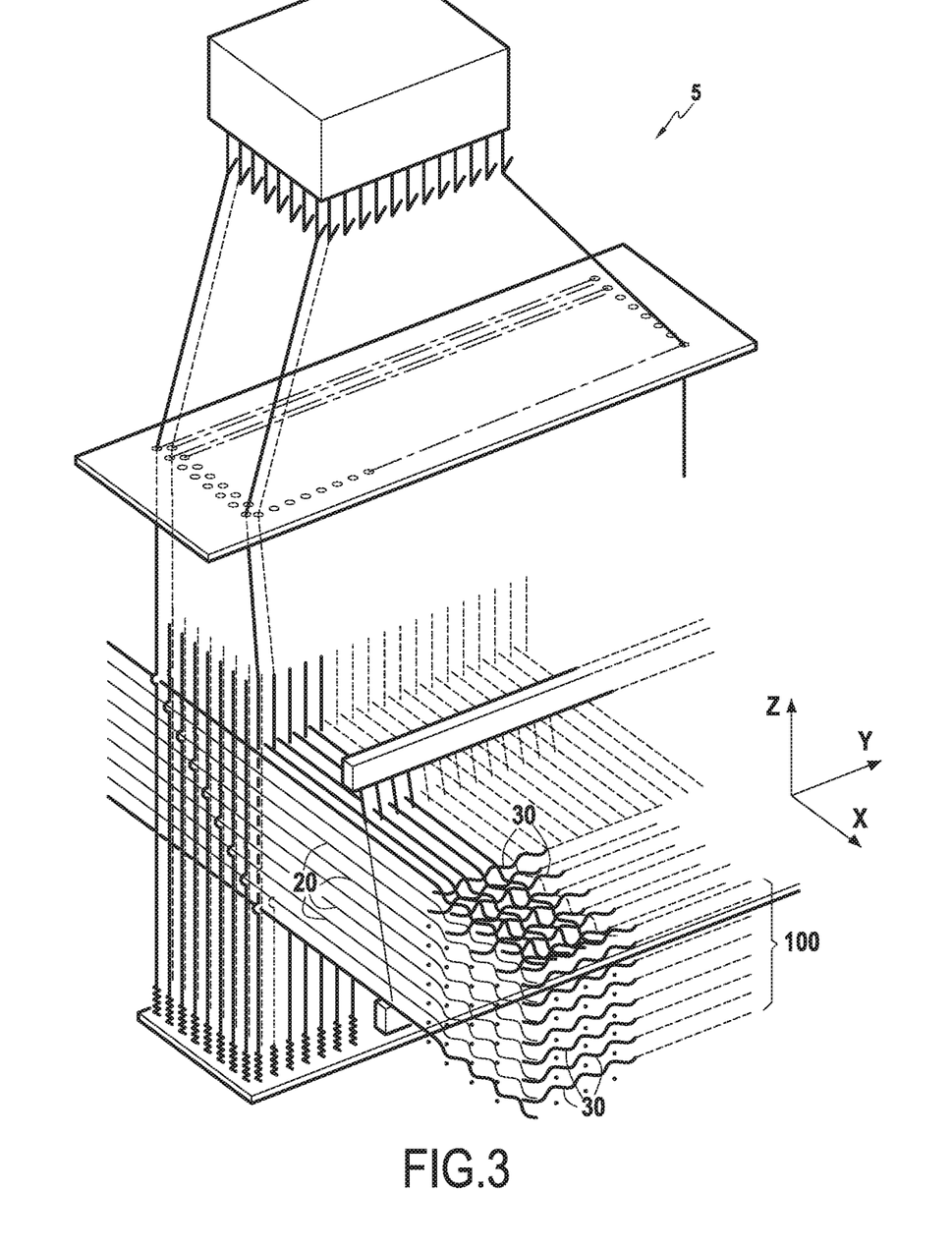
FIG. 3 is a diagrammatic perspective view of a loom showing three-dimensional weaving of a fiber texture.

As shown in FIG. 3, a fiber texture 100 is made in known manner by weaving using a Jacquard type loom 5 having arranged thereon a bundle of warp yarns or strands 20 in a plurality of layers, the warp yarns being interlinked by weft yarns or strands 30. The fiber texture is made by three-dimensional weaving. The term "three-dimensional weaving" or "3D weaving" is used herein to mean a method of weaving whereby at least some of the warp yarns interlink weft yarns over a plurality of layers of warp yarns, or vice versa. An example of three-dimensional weaving is weaving with the so-called "interlock" weave. The term "interlock" weave is used herein to mean a weave in which each layer of weft yarns interlinks a plurality of layers of warp yarns, with all of the yarns in a given warp column having the same movement in the weave plane.

Figure 4A:
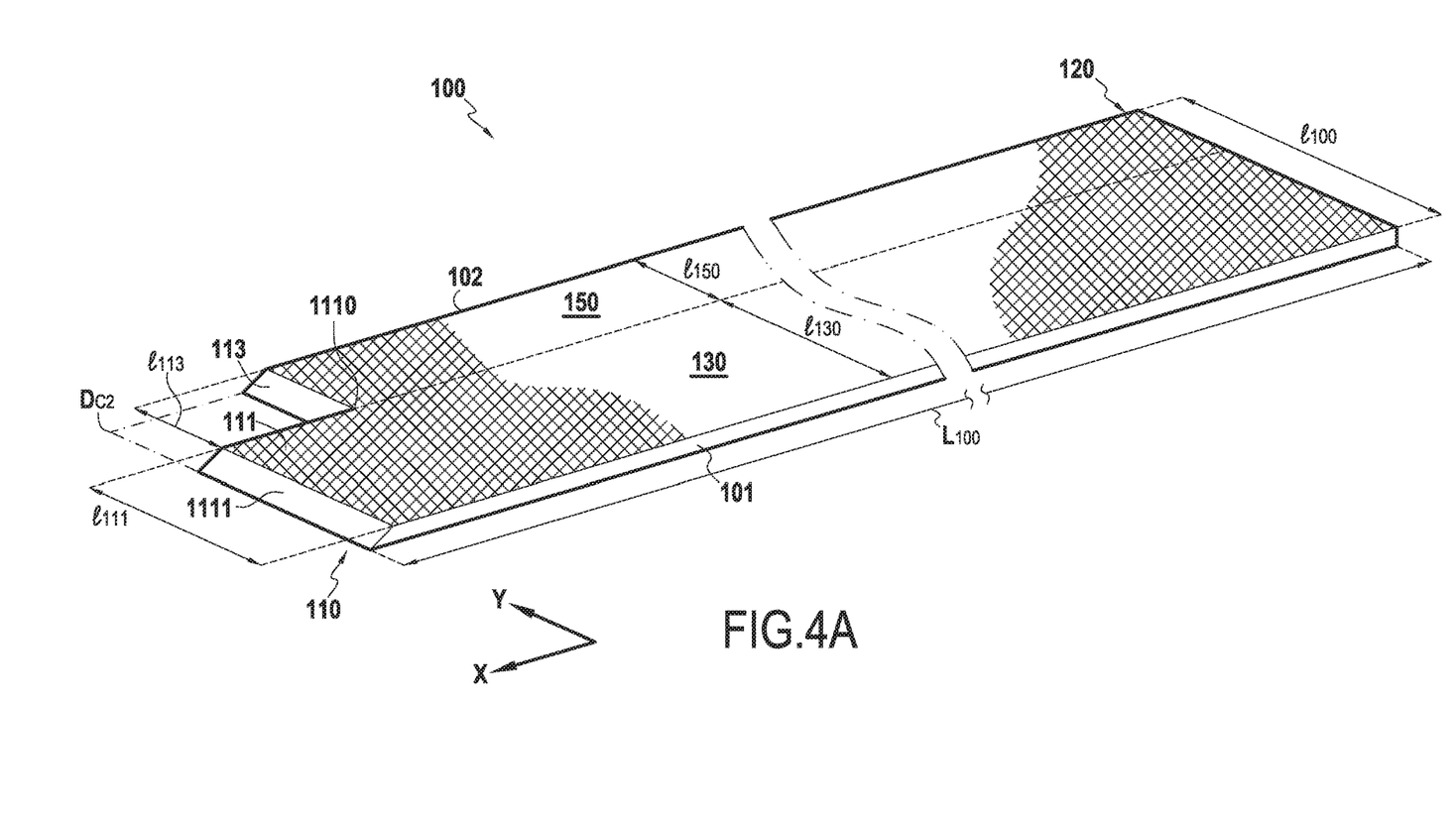
FIG. 4A is a diagrammatic perspective view of a fiber texture in an implementation of the method of the invention.

As shown in FIG. 4A, the fiber texture 100 is in the form of a strip that extends lengthwise in a longitudinal direction X corresponding to the travel direction of the warp yarns or strands 20, and widthwise or transversely in a lateral direction Y between first and second lateral edges 101 and 102, the lateral direction Y corresponding to the direction of the weft yarns or strands 30. The fiber texture extends longitudinally over a determined length $L_{100}$ in the direction X between a proximal portion 110 that is desirably, but not exclusively, to form the start of winding a fiber preform on shaping tooling, and a distal portion 120 that is desirably, but not exclusively, to form the end of winding the fiber preform, the proximal and distal portions overlapping in the winding. The fiber texture also has a central zone 130 extending over a determined length $\ell_{130}$ in the direction Y, the central zone 130 being for forming the drum or shroud of the casing. The central zone 130 is defined between a lateral zone 150 that extends over a determined width $\ell_{150}$ in the direction Y and the lateral edge 101, the lateral zone 150 being intended at least in part to form an annular flange of the casing.

In accordance with the invention, the proximal portion 110 of the fiber texture 100 has an end portion 111 extending in the lateral direction Y so as to be set back from the lateral edge 102 to occupy a determined width $\ell_{111}$ that is less than the width $\ell_{100}$ of the fiber texture 100. The end portion 111 projects in the longitudinal direction X from a longitudinal edge 113 of the fiber texture 100. The end portion 111 extends in the longitudinal direction X between a first end 1110 connected to the fiber structure 100 and a free, second end 1111 opposite from the first end 1110.

The end portion 111 is obtained by making a cutout $D_{c2}$ in the fiber texture in the proximal portion 110. The cutout $D_{c2}$ extends in the lateral direction Y of the fiber texture 100 from the second lateral edge 102 of the fiber texture and over a determined width that is less than the width $\ell_{100}$ of the fiber texture, the width of the cutout $D_{c2}$ desirably corresponding to the width $\ell_{150}$ of the lateral zone 150 that is to form a flange and a portion of the drum of the casing that is to be made. The cutout $D_{c2}$ defines the end portion 111 of the fiber texture 100 that is for fabricating a casing having only one upstream or downstream flange.

Figure 4B:
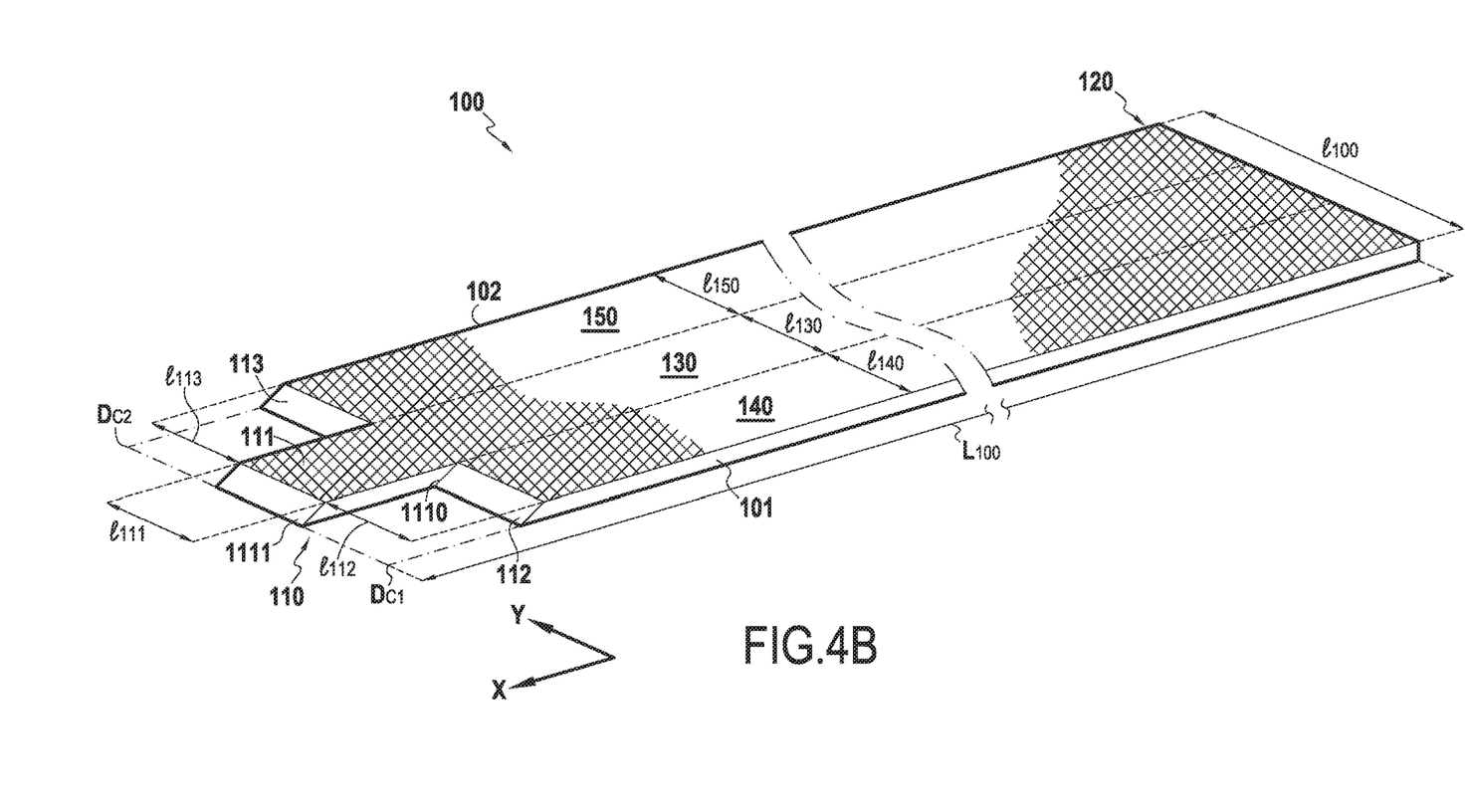
FIG. 4B is a diagrammatic perspective view of a fiber texture in another implementation of the method of the invention.

FIG. 4B shows a variant embodiment of the fiber texture 100 in which the proximal portion 110 of the fiber texture 100 has an end portion 111 extending in the lateral direction Y set back from both the first and second lateral edges 101 and 102 and occupying a determined width $\ell_{111}$ less than the width $\ell_{100}$ of the fiber texture 100. The end portion 111 projects in the longitudinal direction X from the first and second longitudinal edges 112 and 113 of the fiber texture 100 and has an intermediate position between the first and second lateral edges 101 and 102 of the fiber texture. The end portion 111 extends in the longitudinal direction X between a first end 1110 connected to the fiber structure 100 and a free, second end 1111 opposite from the first end 1110.

The end portion 111 is obtained by making first and second cutouts $D_{c1}$ and $D_{c2}$ in the fiber texture in the proximal portion 110. The first cutout $D_{c1}$ extends in the lateral direction Y of the fiber texture 100 from the first lateral edge 101 of the fiber texture over a determined width that is less than the width $\ell_{100}$ of the fiber texture, the width of the first cutout $D_{c1}$ desirably corresponding to the width $\ell_{140}$ of the lateral zone 140 that is to form one of the flanges plus a portion of the drum of the casing that is to be made. Likewise, the second cutout $D_{c2}$ extends in the lateral direction Y of the fiber texture 100 from the second lateral edge 102 of the fiber texture and over a determined width less than the width $\ell_{100}$ of the fiber texture, the width of the second cutout $D_{c2}$ desirably corresponding to the width $\ell_{150}$ of the lateral zone 150 that is to form one of the flanges plus a portion of the drum of the casing that is to be made. The first and second cutouts $D_{c1}$ and $D_{c2}$ define the end portion 111 of the fiber texture 100, which in this example is for fabricating a casing that has two flanges (upstream and downstream).

Figure 5:
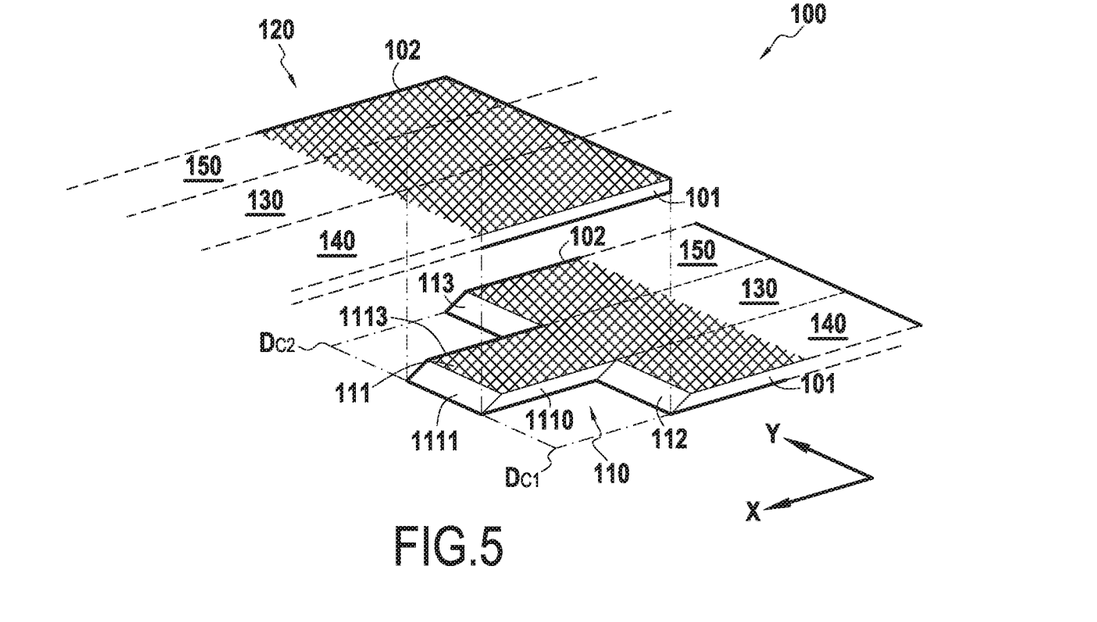
FIG. 5 is a diagrammatic perspective view of the FIG. 4B fiber texture showing the overlap between a distal portion and a proximal portion of the fiber texture.

As shown in FIG. 5, the distal portion 120 is for overlapping the proximal portion 110 once the fiber texture 100 has been fully wound. The length $L_{100}$ of the fiber texture 100 is determined as a function of the circumference of the shaping tooling or mold so as to present a determined number of turns of fiber texture, e.g. four turns, together with the overlap of the proximal and distal portions and the end of winding the fiber texture on the tooling.

Thus, by the presence of an end portion of width in the proximal portion that is reduced compared with the width of the fiber texture outside the proximal portion, no extra thickness is formed in the lateral zones of the fiber texture that are to form the flanges in the overlap portion between the proximal and distal portions.

Figure 11:
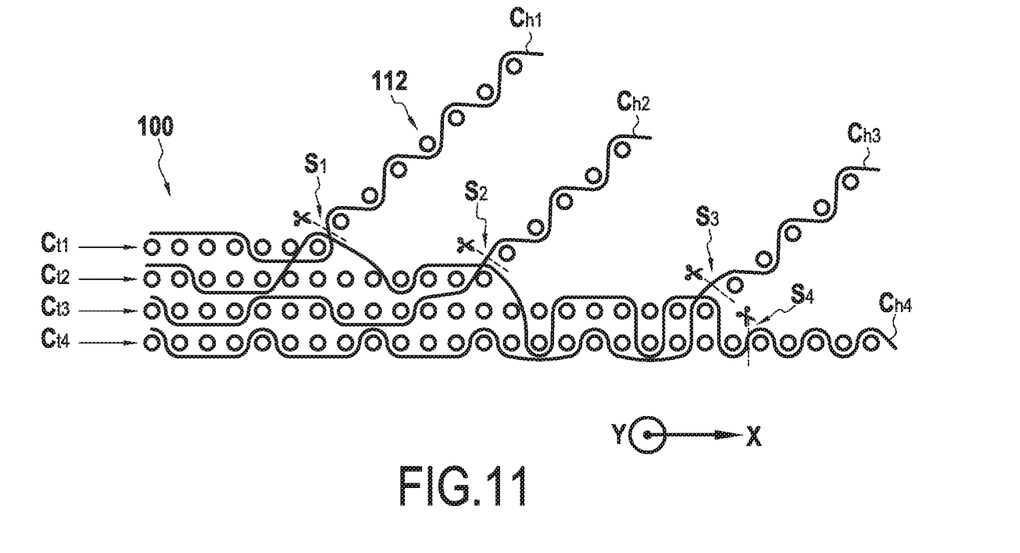
FIG. 11 is a diagrammatic view showing an example of progressively reducing thickness in the fiber texture of FIGS. 4 and 5 so as to obtain an edge of beveled shape.

In the presently-described embodiment, the first and second longitudinal edges 112 and 113 defining the start of the proximal portion 110 of the fiber structure 100 and the free end 1111 of the end portion 111 present a beveled shape (or scarf). Such a bevel shape is obtained by progressively reducing the thickness of the fiber texture at the edges 112 and 113 and at the free end 1111. As shown in FIG. 11, which shows how the longitudinal edge 112 is made, the bevel shape is obtained by progressively extracting layers from the fiber texture and cutting off each of these extracted layers of the fiber texture. More precisely, in FIG. 11, the fiber texture 100 has four warp yarn layers $C_{h1}$ to $C_{h4}$ connecting together four weft yarn layers $C_{t1}$ to $C_{t4}$. The weaving of the fiber texture is modified when extracting layers so as to enable a warp yarn layer to be extracted together with the corresponding weft yarn layer. In FIG. 11, the weaving of the warp yarns belonging to the warp yarn layer $C_{h1}$ goes from three-dimensional weaving to two-dimensional weaving with the weft yarn layer $C_{t1}$ at the exit point $S_1$ from which the warp yarn layer $C_{h1}$ and the weft yarn layer $C_{t1}$ are extracted from the fiber texture, these layers being cut off at the exit point $S_1$. The same modification to the weaving is performed between the layers $C_{h2}$ and $C_{t2}$, $C_{h3}$ and $C_{t3}$, and $C_{h4}$ and $C_{t4}$ respectively at the exit points $S_2$, $S_3$ and $S_4$ from which the layers $C_{h2}$ and $C_{t2}$, $C_{h3}$ and $C_{t3}$, and $C_{h4}$ and $C_{t4}$ are extracted from the fiber texture. Since the exit points $S_1$ to $S_4$ are offset from one another in the direction X, the thickness is thus reduced progressively, making it possible to obtain a longitudinal edge of bevel shape. A similar reduction in thickness is performed at the second longitudinal edge 113 of the fiber structure 100 and at the free end 1111 of the end portion 111 in order to obtain a bevel shape.

The bevel shape at the longitudinal edges 112 and 113 and at the free end 1111 makes it possible to avoid having an excessively abrupt transition on stacking the first turns of the fiber texture on the proximal portion.

Figure 6:
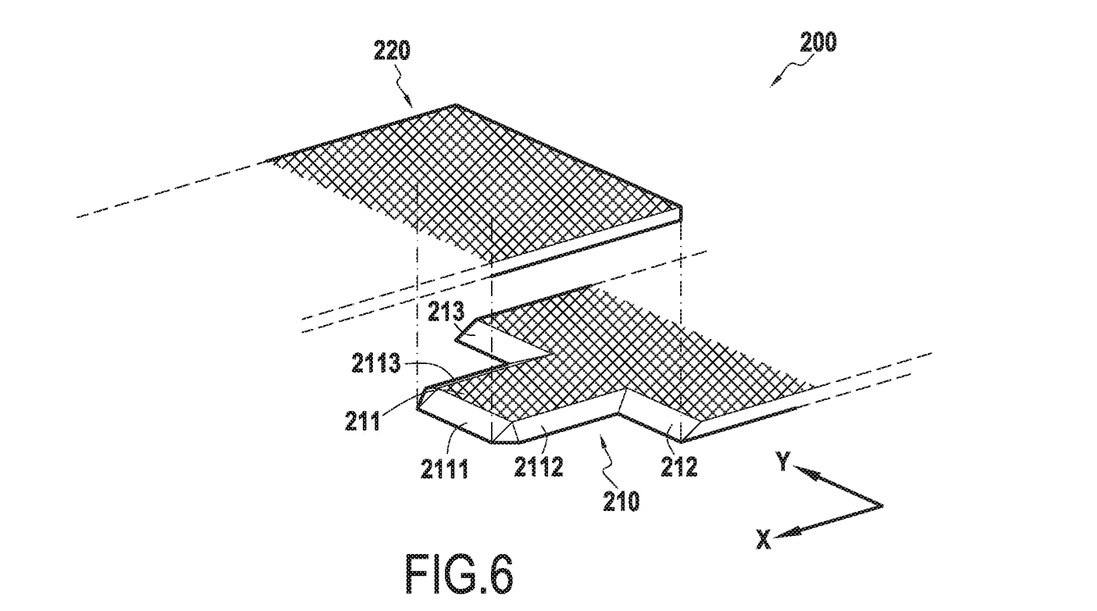
FIG. 6 is a diagrammatic perspective view showing the overlap between a distal portion and a proximal portion of a fiber texture in another implementation of the method of the invention.

FIG. 6 shows a fiber texture 200 that differs from the above-described texture 100 in that the end portion 211 present in the proximal portion 210 of the fiber texture 200 has first and second lateral edges 2112 and 2113 of bevel shape that can be obtained by progressively reducing thickness by extracting weft layers as described above with reference to FIG. 11. In the same manner as for the fiber texture 100, the first and second longitudinal edges 212 and 213 defining the start of the proximal portion 210 of the fiber texture 200 and the free end 2111 of the end portion 211 all present a bevel shape. The other characteristics of the fiber texture 200 are identical to the fiber texture 100 described above and are not described again for simplification purposes. It should be recalled merely that the fiber structure 200 has a distal portion 220 that is to overlap the proximal portion 210 at end of winding the fiber texture 200 on shaping tooling.

The bevel shape of the lateral edges 2112 and 2113 makes it possible to avoid a transition that is too abrupt when stacking the first turns of the fiber texture on the proximal portion.

Figure 7A:
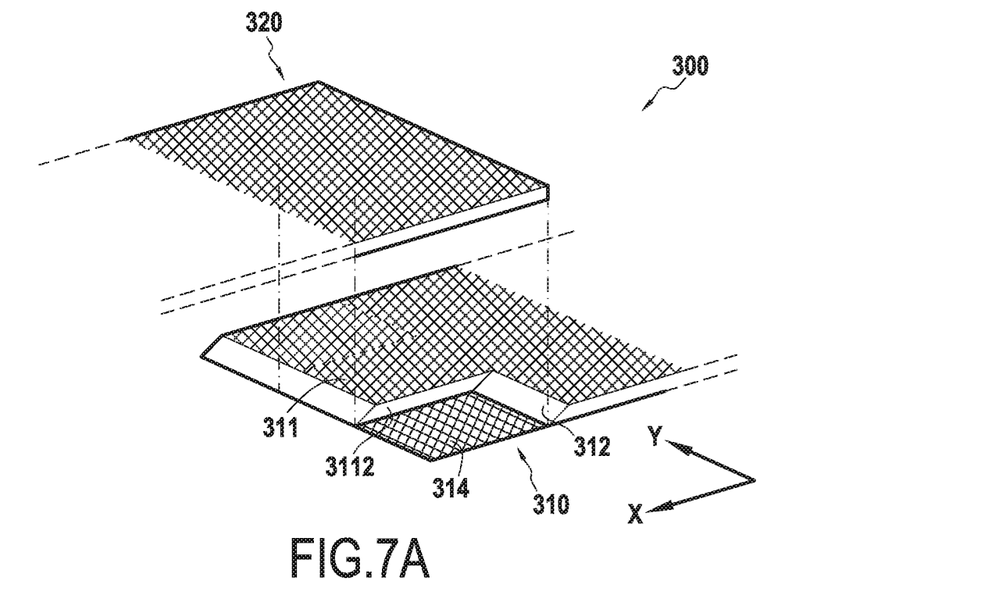
FIG. 7A is a diagrammatic perspective view showing the overlap between a distal portion and a proximal portion of a fiber texture in another implementation of the method of the invention.

FIG. 7A shows a fiber texture 300 that differs from the above-described structure 100 in that the proximal portion 310 has a layer of two-dimensional woven fabric 314 present on one side of the end portion 311 in the direction Y. In other words, the portion emptied by a cutout in the fiber texture 100 includes, in this example, a layer of two-dimensional woven fabric 314. More precisely, the layer of two-dimensional fabric 314 extends from the first longitudinal edge 312 defining the start of the proximal portion 310 of the fiber texture 300 and the lateral edge 3112 of the end portion 311. The two-dimensional fabric layer 314 is of thickness smaller than the thickness of the fiber texture 300. The two-dimensional fabric layer 314 may for example be obtained by conserving the two-dimensional fabric layer formed between the warp yarn layer $C_{h4}$ and the weft yarn layer $C_{t4}$ in FIG. 11, i.e. by not cutting off this two-dimensional fabric layer at the exit point $S_4$. This serves to obtain both a longitudinal edge 312 of bevel shape and a two-dimensional fabric layer 314 extending from the longitudinal edge 312.

The two-dimensional fabric layer 314 serves to improve the final appearance of the part in the cutout zone since the residue or fuzz of fibers where the yarns are cut (exit points $S_1$ to $S_3$ for example) are covered by the two-dimensional fabric layer and are therefore not visible in the final part.

The other characteristics of the fiber texture 300 are identical to the above-described fiber texture 100 and are not described again for simplification purposes. It should merely be recalled that the fiber structure 300 has a distal portion 320 for overlapping the proximal portion 310 at the end of winding the fiber texture 300 on shaping tooling.

Figure 7B:
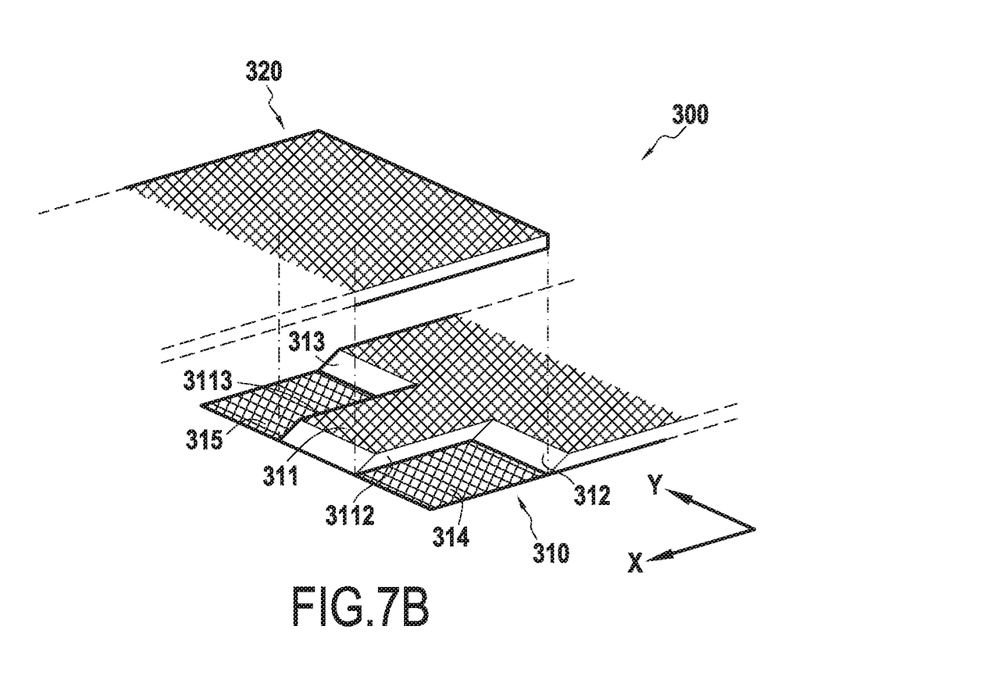
FIG. 7B is a diagrammatic perspective view showing the overlap between a distal portion and a proximal portion of a fiber texture in another implementation of the method of the invention.

FIG. 7B shows a variant embodiment of the fiber texture 300 in which the proximal portion 310 has first and second two-dimensional fabric layers 314 and 315 present on respective sides of the end portion 311 in the direction Y. In other words, in this example, each of the portions emptied by the first and second cutouts $D_{c1}$ and $D_{c2}$ in the fiber texture 100, includes a respective two-dimensional fabric layer 314, 315. More precisely, the first two-dimensional fabric layer 314 extends from the first longitudinal edge 312 defining the start of the proximal portion 310 of the fiber texture 300 and from the first lateral edge 3112 of the end portion 311. The second two-dimensional fabric layer 315 extends from the second longitudinal edge 313 defining the start of the proximal portion 310 of the fiber texture 300 and the second lateral edge 3113 of the end portion 311. The first and second two-dimensional fabric layers 314 and 315 present a thickness that is less than the thickness of the fiber texture 300. By way of example, the two-dimensional fabric layers 314 and 315 may be obtained by conserving the two-dimensional fabric layer formed between the warp yarn layer $C_{h4}$ and the weft yarn layer $C_{t4}$ of FIG. 11, i.e. by not cutting off this two-dimensional fabric layer at the exit point $S_4$. In this way, a longitudinal edge 312 or 313 of bevel shape is obtained together with a two-dimensional fabric layer 314 or 315 extending from the longitudinal edge 312 or 313.

The two-dimensional fabric layers 314 and 314 serve to improve the final aspect of the part in the cutout zones since the residue or fuzz of fibers where the yarns are cut (e.g. exit points $S_1$ to $S_3$) are covered by the two-dimensional fabric layers and are therefore not visible on the final part.

Figure 8A:
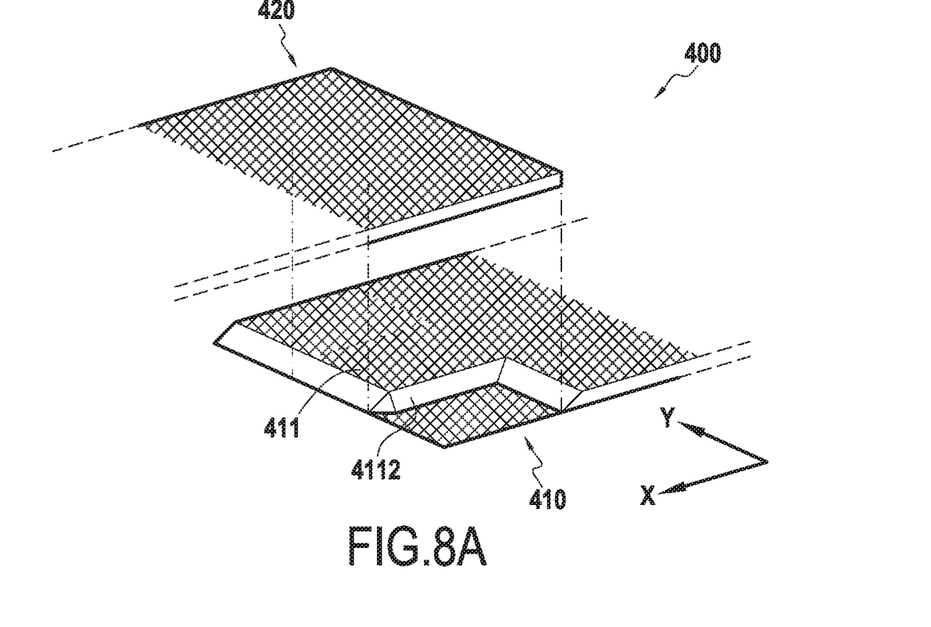
FIG. 8A is a diagrammatic perspective view showing the overlap between a distal portion and a proximal portion of a fiber texture in another implementation of the method of the invention.

FIG. 8A shows a fiber texture 400 that differs from the fiber texture 300 described above with reference to FIG. 7A only in that the end portion 411 present in the proximal portion 410 that is to be overlapped by the distal portion 420 includes a lateral edge 4112 of bevel shape that can be obtained by progressively reducing thickness by extracting layers, as described above with reference to FIG. 11.

Figure 8B:
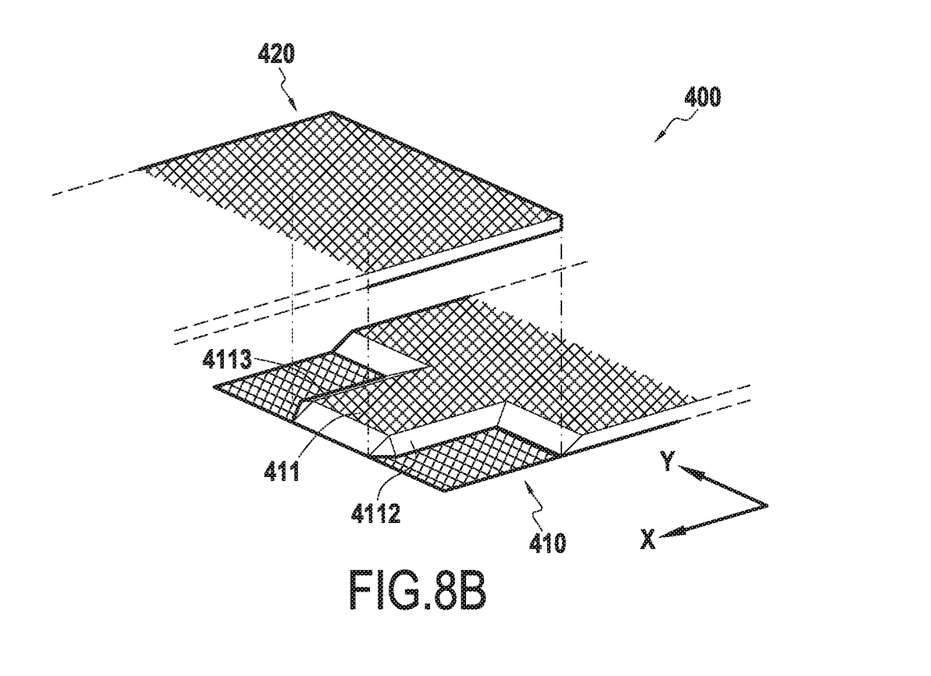
FIG. 8B is a diagrammatic perspective view showing the overlap between a distal portion and a proximal portion of a fiber texture in another implementation of the method of the invention.

FIG. 8B shows a fiber texture 400 that differs from the fiber texture 300 described above with reference to FIG. 7B only in that the end portion 411 present in the proximal portion 410 that is overlapped by the distal portion 420 includes first and second lateral edges 4112 and 4113 presenting a bevel shape that can be obtained by progressively reducing thickness by extracting layers as described above with reference to FIG. 11.

Figure 9:
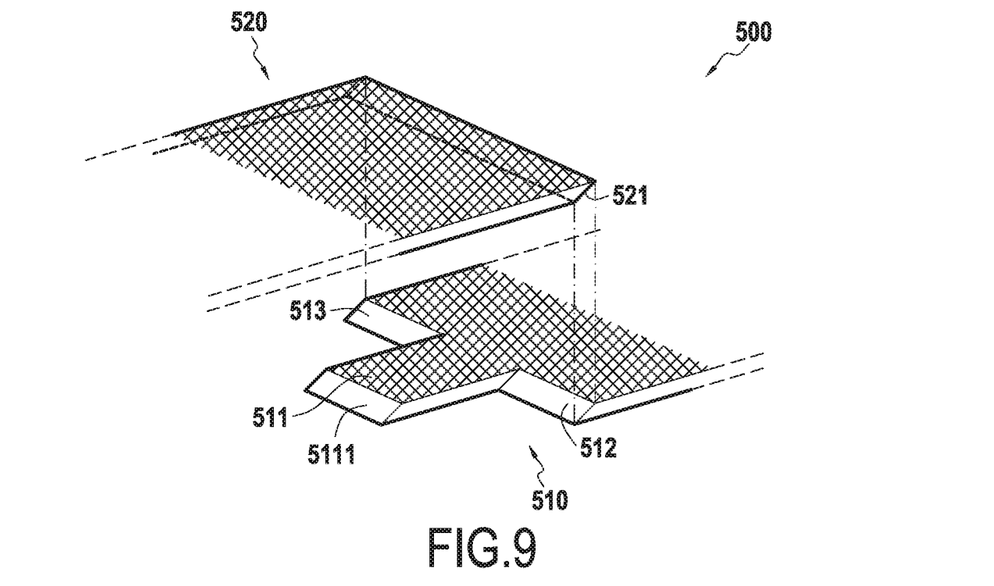
FIG. 9 is a diagrammatic perspective view showing the overlap between a distal portion and a proximal portion of a fiber texture in another implementation of the method of the invention.
Figure 12:
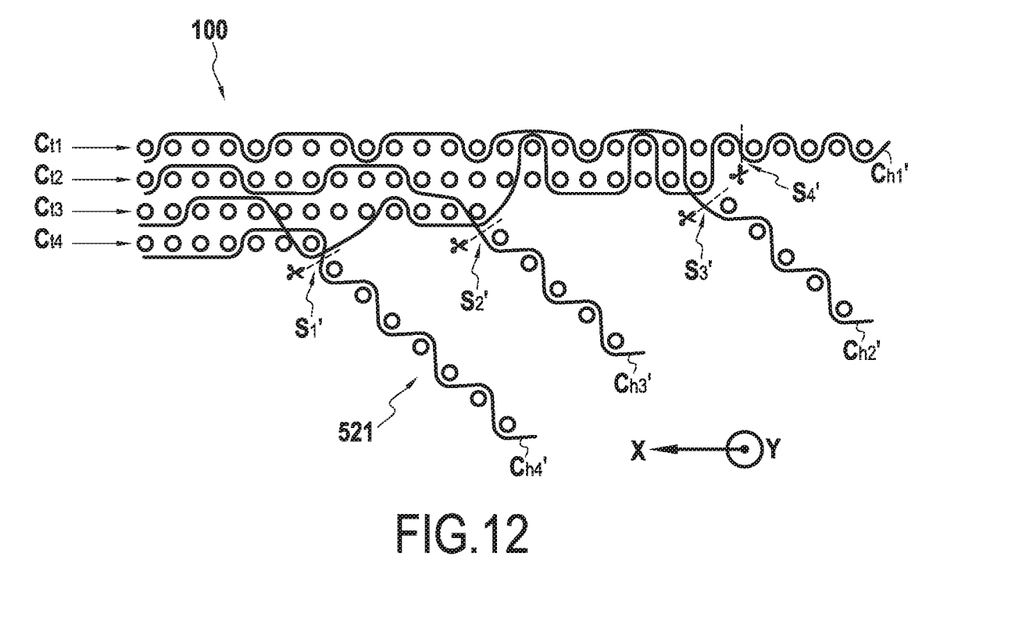
FIG. 12 is a diagrammatic view showing an example of progressively reducing thickness in the fiber texture of FIG. 9 so as to obtain an edge of beveled shape.

FIG. 9 shows a fiber texture 500 that differs from the fiber texture 300 described above only in that the distal portion 520 that is to overlap the proximal portion 510 includes a longitudinal edge 521 that presents a bevel shape with a slope that is opposite to the slope of the bevel shape of the longitudinal edges 512 and 513 defining the start of the proximal portion 510 of the fiber texture 500 and the free end 5111 of the end portion 511. The bevel shape of the longitudinal edge 521 as shown in FIG. 9 can be obtained by progressively reducing thickness by extracting layers in the opposite manner to that shown in FIG. 11. More precisely, and as shown in FIG. 12, which shows how the longitudinal edge 521 is made, the bevel shape is obtained by progressively extracting layers from the fiber texture and by cutting off each of the layers extracted from the fiber texture. In FIG. 12, the fiber texture 100 has four warp yarn layers $C_{h1}'$ to $C_{h4}'$ interlinking four weft yarn layers $C_{t1}'$ to $C_{t4}'$. The weaving of the fiber texture is modified on extracting the layers so as to enable a warp yarn layer to be extracted together with the corresponding weft yarn layer. In FIG. 12, the weaving of the warp yarns belonging to the warp yarn layers $C_{h4}'$ goes from three-dimensional weaving to two-dimensional weaving with the weft yarn layers $C_{t4}'$ at the exit point $S_1'$ from which the warp yarn layer $C_{h4}'$ and the weft yarn layer $C_{t4}'$ are extracted from the fiber texture, these layers being cut off at the exit point $S_1'$. The same modification of the weaving is performed between the layers $C_{h3}'$ and $C_{t3}'$, $C_{h2}'$ and $C_{t2}'$, and $C_{h1}'$ and $C_{t1}'$ respectively at the exit points $S_2'$, $S_3'$, and $S_4'$ from which the layers $C_{h3}'$ and $C_{t3}'$, $C_{h2}'$ and $C_{t2}'$, and $C_{h1}'$ and $C_{t1}'$ are extracted from the fiber texture. The exit points $S_1'$ to $S_4'$ are offset from one another in the direction X, thereby achieving a progressive reduction in thickness that makes it possible to obtain a longitudinal edge that is of bevel shape.

The bevel shape of the longitudinal edge 521 makes it possible to avoid a transition that is too abrupt when stacking the last turn of the fiber texture on the proximal portion.

Figure 10:
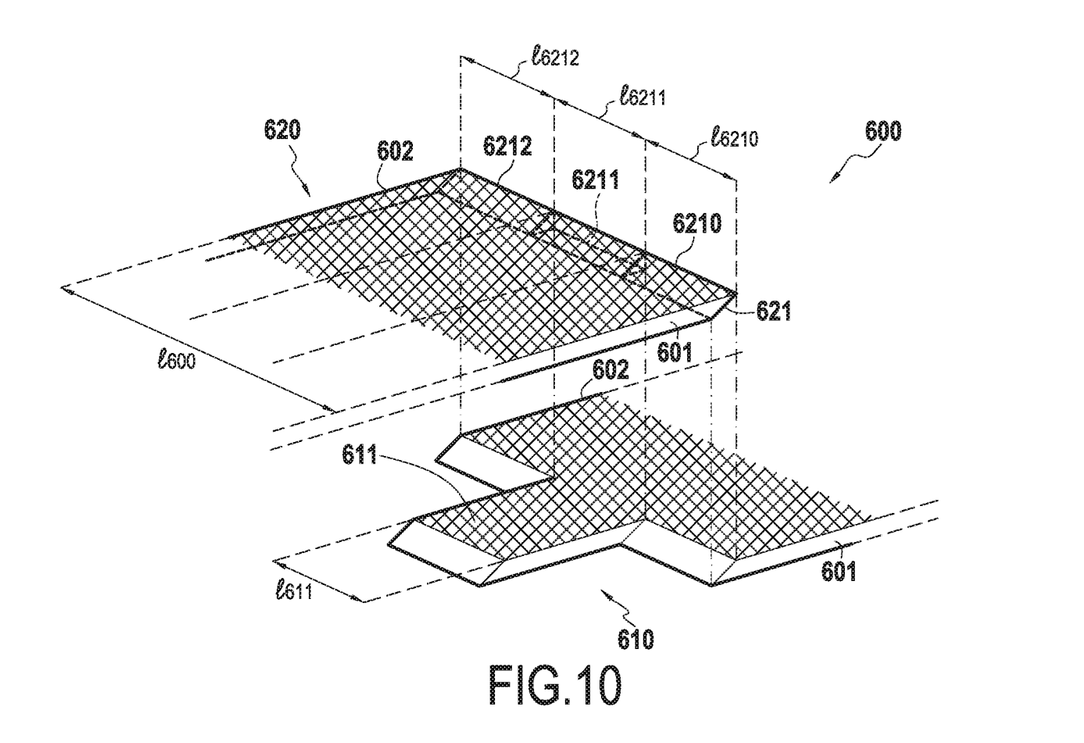
FIG. 10 is a diagrammatic perspective view showing the overlap between a distal portion and a proximal portion of a fiber texture in another implementation of the method of the invention.

FIG. 10 shows a fiber texture 600 that differs from the above-described fiber texture 500 only in that the longitudinal edge 621 of the distal portion 620 that is to overlap the proximal portion of the fiber texture 600 presents a first portion of bevel shape 6210 extending in the lateral direction Y from the first lateral edge 601 of the fiber texture 600 and over a width $\ell_{6210}$ that is less than the width $\ell_{600}$ of the fiber texture, a second bevel shape portion 6212 extending in the lateral direction Y from the second lateral edge 602 of the fiber texture 600 over a width $\ell_{6212}$ that is shorter than the width $\ell_{600}$ of the fiber texture 600, and a third portion 6211 of rectilinear shape present between the first and second portions 6210 and 6212, the third portion 6211 extending in the lateral direction Y over a width $\ell_{6211}$ corresponding to the width $\ell_{611}$ of the end portion 611 of the proximal portion 610 of the fiber texture 600.

The bevel shape of the first and second portions 6210 and 6212 of the longitudinal edge 621 of the distal portion 620 makes it possible to avoid a transition that is too abrupt when stacking the last turn of the fiber texture on the proximal portion.

The fiber texture of the invention may be woven in particular from fibers of carbon, of ceramic, such as silicon carbide, of glass, or indeed of aramid.

Figure 13:
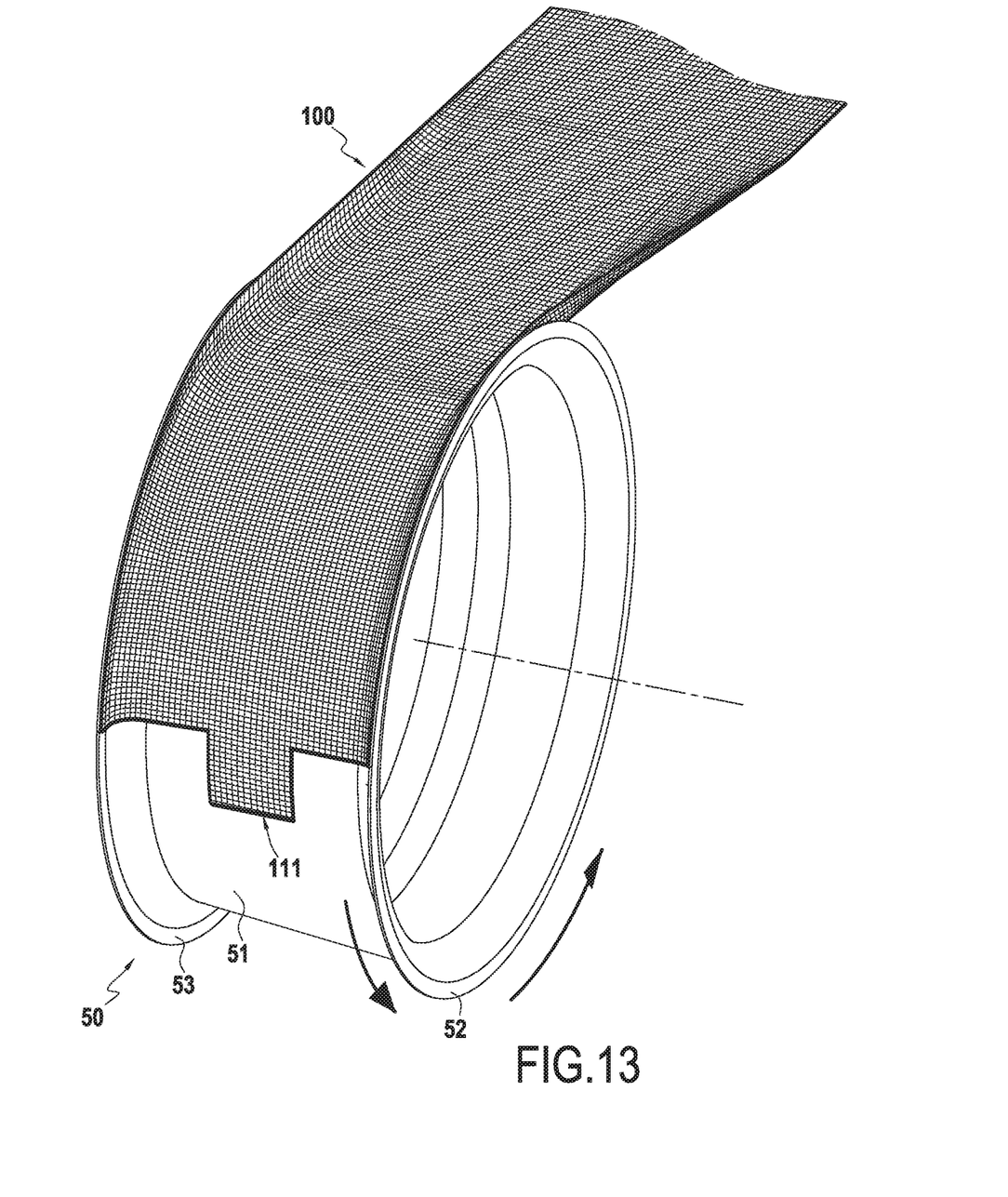
FIG. 13 is a diagrammatic perspective view showing a fiber texture being wound on casing tooling.

As shown in FIG. 13, fiber reinforcement is formed by winding the above-described fiber texture 100 on a mandrel 50, the fiber reinforcement constituting a complete tubular fiber preform for a casing in a single piece. For this purpose, the mandrel 50 presents an outside surface 51 of profile corresponding to the inside surface of the casing that is to be made. The mandrel 50 also has two end plates 52 and 53 for shaping the portions of the fiber preform that correspond to the flanges of the casing.

Figure 14:
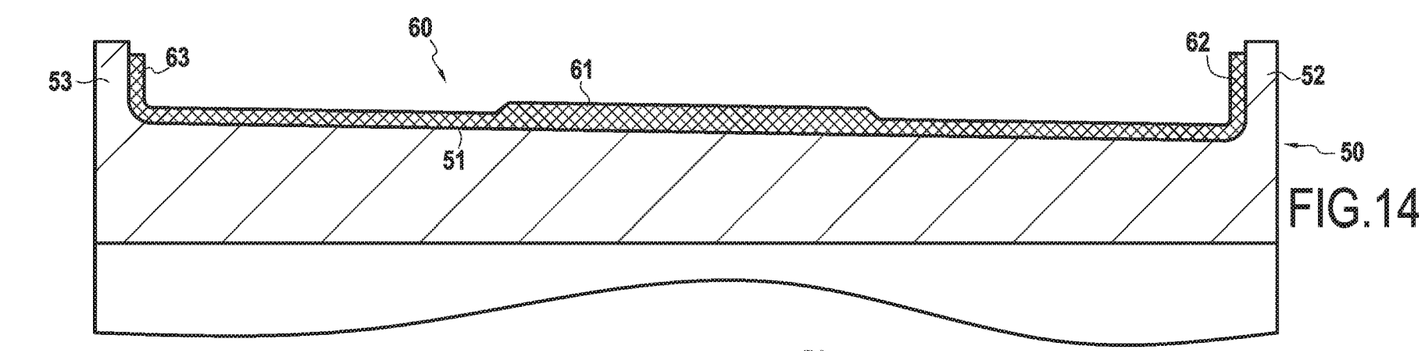
FIG. 14 is a half-view in axial section of a casing preform obtained by winding a fiber texture, as shown in FIG. 13.

FIG. 14 is a section view of the fiber preform 60 obtained after winding several layers of the fiber texture 100 on the mandrel 50, this view showing the preform in the overlap zone between the distal portion and the proximal portion of the fiber texture. The number of layers or turns depends on the desired thickness and on the thickness of the fiber texture. In an embodiment, it is desirably at least two. In the presently-described example, the preform 60 has four layers of fiber texture 100.

A fiber preform 60 is obtained having a central portion 61 presenting extra thickness due to the overlap of the distal and proximal portions and of the end portions 62, 63 of smaller thickness corresponding to the flanges of the casing to be made. The reduced thickness of the end portions 62 and 63 is obtained by the proximal portion 110 of the fiber texture 100 that includes the end portion 111 presenting a width $\ell_{111}$ that is less than the width $\ell_{100}$ of the fiber texture 100 (FIG. 5).

Thereafter, the fiber preform 60 is densified with a matrix.

The fiber preform is densified by filling in the pores of the preform throughout all or part of its volume by means of the material that constitutes the matrix.

The matrix may be obtained in known manner by using a liquid technique.

Figure 15:
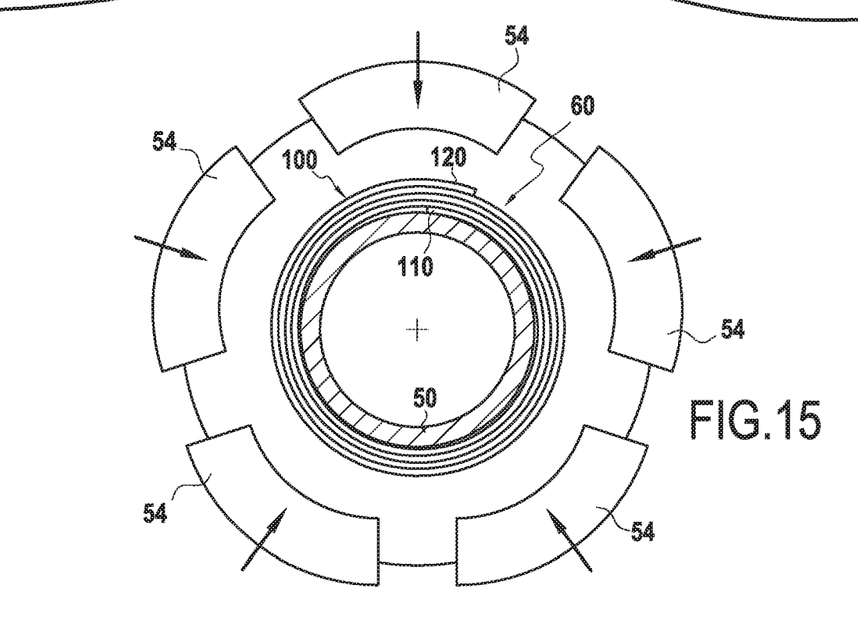
FIG. 15 is a section view showing the position of injection sectors on the FIG. 14 casing preform.

The liquid technique consists in impregnating the preform with a liquid composition containing an organic precursor of the matrix material. As a general rule, the organic precursor is in the form of a polymer, such as a resin, possibly diluted in a solvent. The fiber preform is placed in a mold that can be closed in leaktight manner so as to have a recess with the final shape of the molded part. As shown in FIG. 15, the fiber preform 60 in this example is placed between a plurality of sectors 54 forming a mold cover and the mandrel 50 forming a support, these elements presenting respectively the outside shape and the inside shape of the casing that is to be made. Thereafter, the precursor liquid, e.g. a resin, is injected into the matrix throughout the recess in order to impregnate the entire fiber portion of the preform.

The precursor is transformed into an organic matrix, i.e. it is polymerized, by performing heat treatment, generally by heating the mold, after eliminating the solvent, if any, and after cross-linking the polymer, with the preform being held continuously inside the mold of shape that corresponds to the shape of the part that is to be made. The organic matrix may in particular be obtained from epoxy resin, e.g. such as commercially available high performance epoxy resin or liquid precursors for matrices of carbon or of ceramic.

When forming a matrix of carbon or ceramic, the heat treatment consists in polymerizing the organic precursor in order to transform the organic matrix into a carbon or ceramic matrix depending on the precursor being used and on the pyrolysis conditions. By way of example, liquid precursors for carbon may be resins having a relatively high coke content, such as phenolic resins, while liquid precursors for ceramic, and in particular for SiC, may be resins of the polycarbozilane (PCS) type, or of the polytitanocarbosilane (PTCS) type, or of the polysilzane (PSZ) type. Several consecutive cycles going from impregnation up to heat treatment may be performed in order to reach the desired degree of densification.

In an aspect of the invention, the fiber preform may be densified by the well-known resin transfer molding (RTM) method. In the RTM method, the fiber preform is placed in a mold having the shape of the casing that is to be made. A thermosetting resin is injected into the inside space defined between the rigid material part and the mold and containing the fiber preform. A pressure gradient is generally established in this inside space between the location where the resin is injected and the discharge orifices for the resin so as to control and optimize the impregnation of the preform with the resin.

By way of example, the resin used may be an epoxy resin. Resins suitable for RTM methods are well known. They desirably present low viscosity in order to facilitate injecting them between the fibers. The choice of the temperature class and/or of the chemical nature of the resin is determined as a function of the thermomechanical stresses to which the part is to be subjected. Once the resin has been injected throughout the reinforcement, it is polymerized by heat treatment in compliance with the RTM method.

Figure 16:
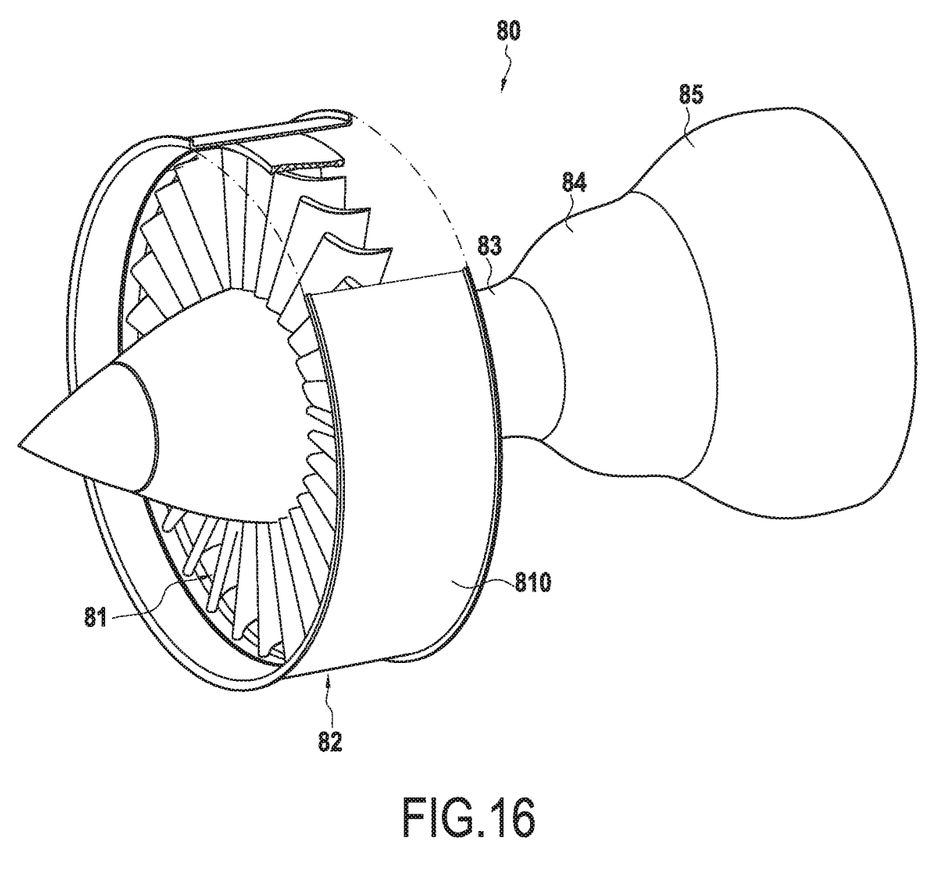
FIG. 16 is a perspective view of an aeroengine in accordance with an embodiment of the invention.

After injection and polymerization, the part is unmolded. In the end, the part is trimmed in order to remove excess resin and the chamfers are machined in order to obtain a casing 810 having the form of a body of revolution as shown in FIG. 16. The casing 810 shown in FIG. 16 is a fan casing of a gas turbine aeroengine 80. Such an engine, as shown diagrammatically in FIG. 16, comprises, from upstream to downstream in the flow direction of the gas stream: a fan 81 arranged at the inlet of the engine; a compressor 82; a combustion chamber 83; a high pressure turbine 84; and a low pressure turbine 85. The engine is housed inside a casing made up of a plurality of portions corresponding to different elements of the engine. Thus, the fan 81 is surrounded by the casing 810.

The invention claimed is:

1. A fiber texture for fabricating a composite material casing, the fiber texture being for winding to form fiber reinforcement of a composite material casing, said fiber texture being in the form of a strip extending in a longitudinal direction over a determined length between a proximal portion and a distal portion, and in a lateral direction over a determined width between a first lateral edge and a second lateral edge, the fiber texture presenting three-dimensional or multilayer weaving between a plurality of layers of warp yarns and a plurality of layers of weft yarns;
   wherein the proximal portion has an end portion extending in the lateral direction so as to be set back from at least one of the first and second lateral edges and over a determined width that is less than a width of said fiber texture, the end portion projecting in the longitudinal direction from at least one longitudinal edge of the fiber texture, the end portion extending in the longitudinal direction between a first end connected to the fiber texture and a free, second end opposite from the first end,
   wherein the fiber texture includes a two-dimensional fabric layer extending from the longitudinal edge of the fiber texture from which the end portion projects and from one lateral edge of the end portion, the two-dimensional fabric layer presenting thickness that is less than the thickness of the fiber texture.

2. The fiber texture according to claim 1, wherein the end portion projects in the longitudinal direction from first and second longitudinal edges of the fiber texture and has an intermediate position between the first and second lateral edges of the fiber texture.

3. A fiber texture, for fabricating a composite material casing, the fiber texture being for winding to form fiber reinforcement of a composite material casing,
   said fiber texture being in the form of a strip extending in a longitudinal direction over a determined length between a proximal portion and a distal portion, and in a lateral direction over a determined width between a first lateral edge and a second lateral edge, the fiber texture presenting three-dimensional or multilayer weaving between a plurality of layers of warp yarns and a plurality of layers of weft yarns;
   wherein the proximal portion has an end portion extending in the lateral direction so as to be set back from at least one of the first and second lateral edges and over a determined width that is less than a width of said fiber texture, the end portion projecting in the longitudinal direction from at least one longitudinal edge of the fiber texture, the end portion extending in the longitudinal direction between a first end connected to the fiber texture and a free, second end opposite from the first end,
   wherein the end portion projects in the longitudinal direction from first and second longitudinal edges of the fiber texture and has an intermediate position between the first and second lateral edges of the fiber texture,
   wherein the fiber texture includes a first two-dimensional fabric layer extending from the first longitudinal edge of the fiber texture and the first lateral edge of the end portion, and a second two-dimensional fabric layer extending from the second longitudinal edge of the fiber texture and the second lateral edge of the end portion, the first and second two-dimensional fabric layers presenting thickness less than the thickness of the fiber texture.

4. The fiber texture according to claim 1, wherein the at least one longitudinal edge of the fiber texture and the free end of the end portion present a bevel shape.

5. The fiber texture according to claim 1, wherein the first and second lateral edges of the end portion present a bevel shape.

6. The fiber texture according to claim 1, wherein the distal portion or the proximal portion of the fiber texture includes a longitudinal edge presenting a bevel shape.

7. The fiber texture according to claim 3, wherein the first and second longitudinal edges of the fiber texture and the free end of the end portion present a bevel shape, and wherein the distal portion of the fiber texture includes a longitudinal edge presenting:
   a first portion of bevel shape that is inverted relative to the bevels of the first and second longitudinal edges of the fiber texture and of the free end of the end portion, and extending in the lateral direction from the first lateral edge of the fiber texture and over a width less than the width of the fiber texture;
   a second portion of bevel shape that is inverted relative to the bevels of the first and second longitudinal edges of the fiber texture and of the free end of the end portion, and extending in the lateral direction from the first lateral edge of the fiber texture and over a width less than the width of the fiber texture; and
   a third portion of rectilinear shape present between the first and second portions, the third portion extending in the lateral direction over a width corresponding to the width of the end portion of the proximal portion of the fiber texture.

8. A gas turbine casing made of composite material with fiber reinforcement comprising a plurality of superposed layers of fiber texture according to claim 1, said fiber reinforcement being densified by a matrix.

9. The gas turbine aeroengine having a fan casing according to claim 8.

10. The fiber texture according to claim 1, wherein the distal portion of the fiber texture includes a longitudinal edge presenting one or more portions presenting a bevel shape.

* * * * *